United States Patent
Takagi

(10) Patent No.: US 12,068,910 B2
(45) Date of Patent: Aug. 20, 2024

(54) CONTROL DEVICE, NETWORK SYSTEM, AND NETWORK SYSTEM CONTROL METHOD AND NON-TRANSITORY COMPUTER READABLE MEDIUM

(71) Applicant: OMRON Corporation, Kyoto (JP)

(72) Inventor: Hiroaki Takagi, Takatsuki (JP)

(73) Assignee: OMRON Corporation, Kyoto (JP)

( * ) Notice: Subject to any disclaimer, the term of this patent is extended or adjusted under 35 U.S.C. 154(b) by 406 days.

(21) Appl. No.: 17/605,240

(22) PCT Filed: Mar. 10, 2020

(86) PCT No.: PCT/JP2020/010244
§ 371 (c)(1),
(2) Date: Oct. 21, 2021

(87) PCT Pub. No.: WO2020/235181
PCT Pub. Date: Nov. 26, 2020

(65) Prior Publication Data
US 2022/0311659 A1   Sep. 29, 2022

(30) Foreign Application Priority Data

May 22, 2019   (JP) .................. 2019-096213

(51) Int. Cl.
*H04L 12/26* (2006.01)
*H04L 41/0631* (2022.01)
*H04L 41/0677* (2022.01)

(52) U.S. Cl.
CPC ...... *H04L 41/0677* (2013.01); *H04L 41/0631* (2013.01)

(58) Field of Classification Search
CPC .. H04B 17/026; H04B 17/023; H04B 17/024; H04B 17/028; H04B 3/36;
(Continued)

(56) References Cited

U.S. PATENT DOCUMENTS

2003/0056153 A1\* 3/2003 Beer ............... H04L 41/0677
714/43
2005/0207348 A1\* 9/2005 Tsurumi ............ H04L 67/14
370/241

(Continued)

FOREIGN PATENT DOCUMENTS

CN  101127928   2/2008
CN  103404082   11/2013
(Continued)

OTHER PUBLICATIONS

"Search Report of Europe Counterpart Application", issued on May 26, 2023, p. 1-p. 10.
(Continued)

*Primary Examiner* — Phuongchau Ba Nguyen
(74) *Attorney, Agent, or Firm* — JCIPRNET

(57) ABSTRACT

A control device (master device 10) is provided with: a communication instruction unit (112) that instructs a slave device (20c) to execute/stop communication with another device; a diagnosis instruction unit (113) that provides instruction to implement a breakdown diagnosis including detection of a breakdown location; a diagnostic results reading unit (114) that reads out the results of the breakdown diagnosis from the slave device; and a calculation unit (115) that calculates, from the results of the breakdown diagnosis, the length of a communication cable from the slave device to the breakdown location.

14 Claims, 5 Drawing Sheets

(58) Field of Classification Search
CPC . H04L 41/0677; H04L 41/0631; H04L 12/28; H04L 41/0659; H04L 43/0811; H04L 69/40; G05B 19/4185; G05B 19/0425; G05B 2219/2231; G06F 11/0706; G06F 11/0751; G06F 11/0766; Y02P 90/02
See application file for complete search history.

(56) References Cited

U.S. PATENT DOCUMENTS

| | | | | |
|---|---|---|---|---|
| 2008/0013457 | A1 | 1/2008 | Berman et al. | |
| 2013/0282148 | A1* | 10/2013 | Koyama | G05B 19/4185 700/56 |
| 2014/0047056 | A1* | 2/2014 | Tahara | H04L 43/0811 709/208 |
| 2015/0133122 | A1* | 5/2015 | Chen | H04W 36/04 455/436 |
| 2015/0293871 | A1* | 10/2015 | Rahamim | G06F 13/24 710/106 |
| 2016/0116895 | A1* | 4/2016 | Yagi | G05B 19/058 700/79 |
| 2022/0147006 | A1* | 5/2022 | Ishimura | G05B 19/0421 |
| 2023/0064446 | A1* | 3/2023 | Takeda | H04B 3/46 |

FOREIGN PATENT DOCUMENTS

| | | |
|---|---|---|
| CN | 105307904 | 2/2016 |
| EP | 2672662 | 12/2013 |
| JP | 2006325121 | 11/2006 |
| JP | 2010245589 | 10/2010 |
| JP | 2011117738 | 6/2011 |
| JP | 2013236162 | 11/2013 |
| JP | 2014171025 | 9/2014 |
| JP | 2015220547 | 12/2015 |
| WO | 2012090291 | 7/2012 |

OTHER PUBLICATIONS

Anonymous, "Industrial Communication Brochure," Siemens AG, Apr. 2011, pp. 1-60.

Xue-Lian Luo, "Fault Diagnosis Technology of PLC Control System", Measurement and Control Technique, with English abstract, Jun. 15, 2004, pp. 79-81.

Office Action of China Counterpart Application, with English translation thereof, issued on Oct. 12, 2023, pp. 1-21.

"International Search Report (Form PCT/ISA/210) of PCT/JP2020/010244," mailed on Jun. 2, 2020, with English translation thereof, pp. 1-4.

"Written Opinion of the International Searching Authority (Form PCT/ISA/237) of PCT/JP2020/010244," mailed on Jun. 2, 2020, with English translation thereof, pp. 1-6.

"Office Action of China Counterpart Application", issued on Feb. 1, 2024, with English translation thereof, pp. 1-20.

* cited by examiner ated on Mar. 10, 2020, which claims the priority benefits of Japan Patent Application No. 2019-096213, filed on May 22, 2019. The entirety of each of the above-mentioned patent applications is hereby incorporated by reference herein and made a part of this specification.

BACKGROUND OF THE INVENTION

Field of the Invention

The invention relates to a control device, a network system, and a control method and a control program of a network system.

Description of Related Art

In the field of factory automation (FA), control of various types of devices that share work processes is performed. In order for various controllers, remote I/Os, and manufacturing devices used in the work in certain areas such as factory facilities to be operated in cooperation, an industrial network system, which is also referred to as a field network, that connects these devices is established.

In a general industrial network system, a master-slave network formed by various slave devices and a master device is used. The slave device is a device which controls or collects data of equipment provided in the factory. The master device collectively manages the slaves and is a device referred to as a programmable logic controller (PLC), for example. EtherCAT (registered trademark) or Ethernet/IP is an example of such industrial network system (ETHERNET: registered trademark). In such an industrial network system, communication cables spread among devices to form a network.

PRIOR ART DOCUMENT

Patent Document

[Patent Document 1] Japanese Laid-open No. 2013-236162

SUMMARY OF THE INVENTION

Problems to be Solved by the Invention

When a breakdown, such as disconnection, occurs in a communication cable connecting slave devices, the communication between the slave devices is cut off. In an industrial network system as described above, a slave device can inform the master device of link-off information informing communication disruption between the slave devices. Accordingly, through the master device, the administrator can learn that some communication abnormality occurs between specific slave devices. However, the administrator is unable to learn whether the communication disruption is due to a breakdown of the communication cable. Neither can the administrator learn at which position of the communication cable the place of breakdown is located.

Meanwhile, Patent Document 1 discloses a technique including a function for determining a breakdown state of a communication cable in a communication terminal. However, it is only possible to determine a breakdown state of a communication cable connected to a specific communication terminal from the specific communication terminal.

The invention is made in view of the above issue, and an objective of the invention is to realize a master device allowing an administrator to easily specify a breakdown location of a communication cable in an industrial network system, thereby making it possible to efficiently perform maintenance work on the communication cable.

Means for Solving Problems

In order to solve the above issue, the invention adopts the configuration as follows.

A control device according to an aspect of the invention is suitable for a network system including a master device and a plurality of slave devices. The control device is the master device. The slave device includes: a first communication unit connected with a first another device on a side of the master device by a first communication cable and a second communication unit connected with a second another device on a side opposite to the master device by a second communication cable. The slave device further has: a first detection unit and a first recording unit, provided in the first communication unit, wherein the first detection unit performs a breakdown diagnosis comprising detection of a breakdown location of the first communication cable, and the first recording unit keeps a result of the breakdown diagnosis performed by the first detection unit; and a second detection unit and a second recording unit, provided in the second communication unit, wherein the second detection unit performs a breakdown diagnosis comprising detection of a breakdown location of the second communication cable, and the second recording unit keeps a result of the breakdown diagnosis performed by the second detection unit. The control device includes: a communication instruction unit, instructing the slave device to execute/stop communication with the first another device or the second another device; a diagnosis instruction unit, instructing the slave device to implement the breakdown diagnosis of the first communication cable or the second communication cable; a diagnostic result reading unit, reading out a result of the breakdown diagnosis from the first recording unit or the second recording unit of the slave device; and a calculation unit, calculating a length of the first communication cable or the second communication cable from the slave device to the breakdown location from the result of the breakdown diagnosis that is read out.

A network system according to an aspect of the invention is a network system including a master device and a plurality of slave devices. The slave device includes: a first communication unit connected with a first another device on a side of the master device by a first communication cable and a second communication unit connected with a second another device on a side opposite to the master device by a second communication cable. The slave device further has: a first detection unit and a first recording unit, provided in the first communication unit, wherein the first detection unit performs a breakdown diagnosis comprising detection of a breakdown location of the first communication cable, and the first recording unit keeps a result of the breakdown diagnosis performed by the first detection unit; and a second detection unit and a second recording unit, provided in the second communication unit, wherein the second detection unit performs a breakdown diagnosis comprising detection of a breakdown location of the second communication cable, and the second recording unit keeps a result of the breakdown diagnosis performed by the second detection unit. The master device includes: a communication instruction unit, instructing the slave device to execute/stop communication with the first another device or the second another device a diagnosis instruction unit, instructing the slave device to implement the breakdown diagnosis of the first communication cable or the second communication cable; a diagnostic result reading unit, reading out a result of the breakdown diagnosis from the first recording unit or the second recording unit of the slave device; and a calculation unit, calculating a length of the first communication cable or the second communication cable from the slave device to the breakdown location from the result of the breakdown diagnosis that is read out.

A control method of a network system according to an aspect of the invention is suitable for a network system including a master device and a plurality of slave devices. The slave device includes: a first communication unit connected with a first another device on a side of the master device by a first communication cable and a second communication unit connected with a second another device on a side opposite to the master device by a second communication cable. The slave device further has: a first detection unit and a first recording unit, provided in the first communication unit, wherein the first detection unit performs a breakdown diagnosis comprising detection of a breakdown location of the first communication cable, and the first recording unit keeps a result of the breakdown diagnosis performed by the first detection unit; and a second detection unit and a second recording unit, provided in the second communication unit, wherein the second detection unit performs a breakdown diagnosis comprising detection of a breakdown location of the second communication cable, and the second recording unit keeps a result of the breakdown diagnosis performed by the second detection unit. The control method includes: a step of instructing the slave device to stop communication with the first another device or the second another device; a step of instructing the slave device to implement the breakdown diagnosis of a communication cable in which the communication in the first communication cable or the second communication cable is stopped; a step of reading out a result of the breakdown diagnosis from the first recording unit or the second recording unit of the slave device after a predetermined time from the step of instructing to implement the breakdown diagnosis; and a step of calculating a length of the first communication cable or the second communication cable from the slave device to the breakdown location from the result of the breakdown diagnosis that is read out.

Inventive Effects

According to any of the control device according to an aspect of the invention, the network system according to an aspect of the invention, and the control method of the network system according to an aspect of the invention, the administrator can easily specify the breakdown location of a communication cable in an industrial network system, thereby making it possible to efficiently perform maintenance work on the communication cable.

DESCRIPTION OF THE EMBODIMENTS

Embodiment 1

Figure 1:
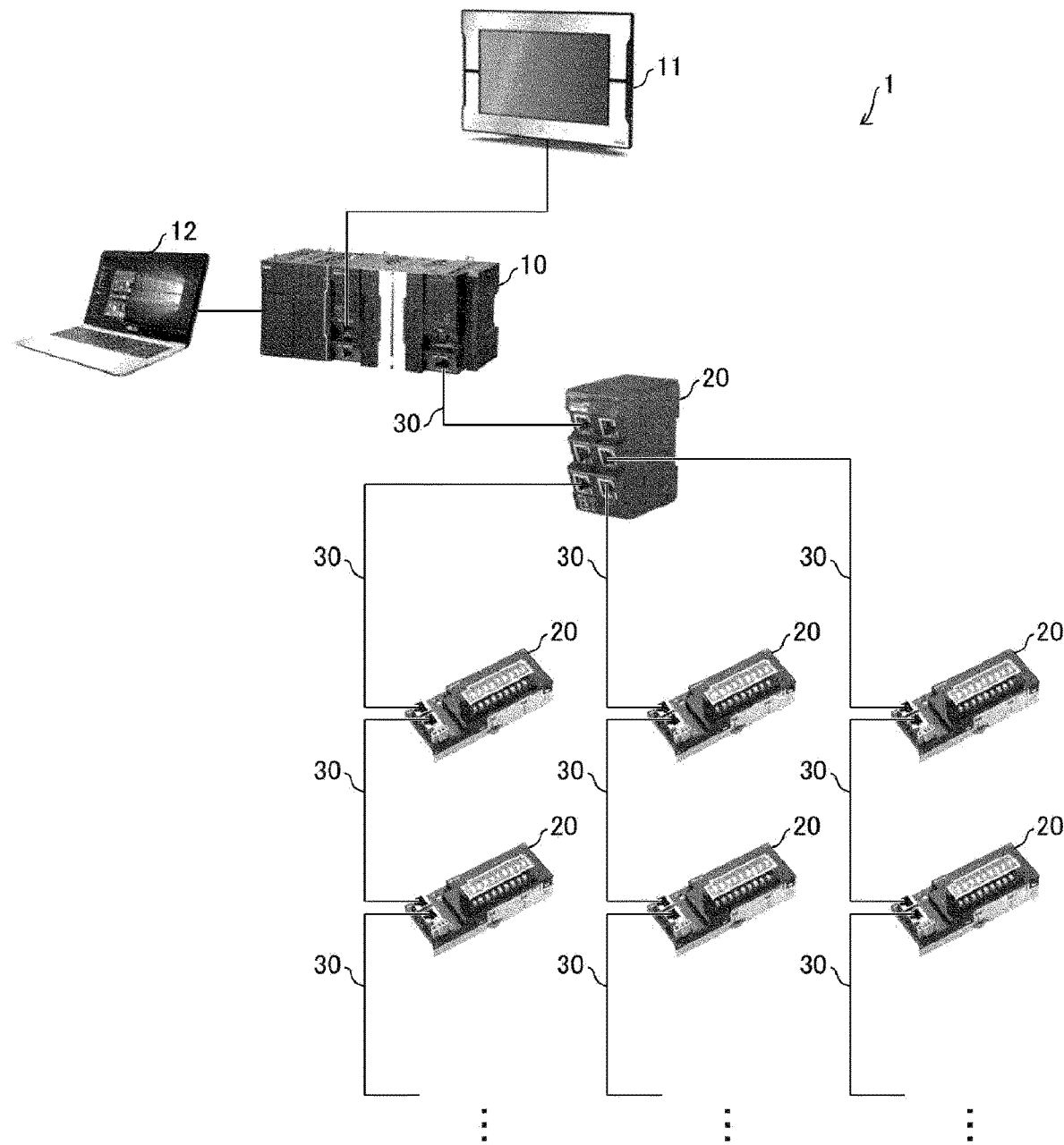
FIG. 1 is a diagram illustrating a network system for which a control device according to Embodiment 1 of the invention is suitable.

In the following, an embodiment (referred to as "the embodiment" in the following) according to an aspect of the invention is described with reference to the drawings.

1. Application Example

Firstly, an example of a case for which the invention is suitable is described. A control device according to the embodiment is used in a network system including a master device and multiple slave devices, and the control device is the master device.

In the network system, the slave device includes a first communication unit connected with a first another device on the master device side by a first communication cable and a second communication unit connected with a second another device on the opposite side with respect to the master device by a second communication cable. The slave device further includes: a first recording unit and a first detection unit provided in the first communication unit, the first detection unit performing a breakdown diagnosis including detection of a breakdown location of the first communication cable, and the first recording unit keeping a result of the breakdown diagnosis performed by the first detection unit; and a second detection unit and a second recording unit provided in the second communication unit, the second detection unit performing a breakdown diagnosis including detection of a breakdown location of the second communication cable, and the second recording unit keeping a result of the breakdown diagnosis performed by the second detection unit.

The control device according to the embodiment includes a communication instruction unit, a diagnosis instruction unit, a diagnostic result reading unit, and a calculation unit. The communication instruction unit instructs the slave device to execute/stop communication with the first another device or the second another device. The diagnosis instruction unit instructs the slave device to implement the breakdown diagnosis of the first communication cable or the second communication cable.

The diagnostic result reading unit reads out the result of the breakdown diagnosis from the first recording unit or the second recording unit of the slave device. The calculation unit calculates the length of the first communication cable or the second communication cable from the slave device to the breakdown location from the result of the breakdown diagnosis that is read out.

According to the embodiment, the control device, which is the master device, can, for a required slave device, instruct to stop communication and execute a breakdown diagnosis including detection of the breakdown location of the communication cable connected to the slave device. In addition, the control device can read out the result of the breakdown diagnosis from the slave device and specify the breakdown location in the required communication cable. Accordingly, the administrator of the network system can easily identify the breakdown location in the communication cables spreading throughout the network system. Therefore, it is possible for the administrator of the network system to remove and replace the location where the cable breakdown occurs in the field network and efficiently execute maintenance work such as specifying and taking countermeasures against the place where cable abnormalities occur frequently.

2. Configuration Example (Overview of Network System)

FIG. 1 is a schematic diagram illustrating a network system 1 including a master device 10 (control device) according to Embodiment 1. The network system 1 is configured to include the master device 10 and multiple slave devices 20. As a specific example, EtherCat (registered trademark) or Ethernet/IP (ETHERNET: registered trademark) is applied to the network system 1.

The slave device 20 has a communication unit (not shown in FIG. 1) on the master side (upstream slide) and a communication unit (not shown in FIG. 1) on the side (downstream side) opposite to the master side, and are each connected with another device (master device 10 or slave device 20) by a communication cable 30.

A display device 11 may also be connected to the master device 10. A communication network, such as Ethernet (registered trademark) or Ethernet/IP, as an example, is applied to the connection between the master device 10 and the display device 11, for example. In addition, a computer 12, which is also referred to as a tool, is connected to the master device 10. As an example, a universal serial bus (USB) is suitable for the connection between the master device 10 and the computer 12.

(Configuration of Master Device)

Figure 2:
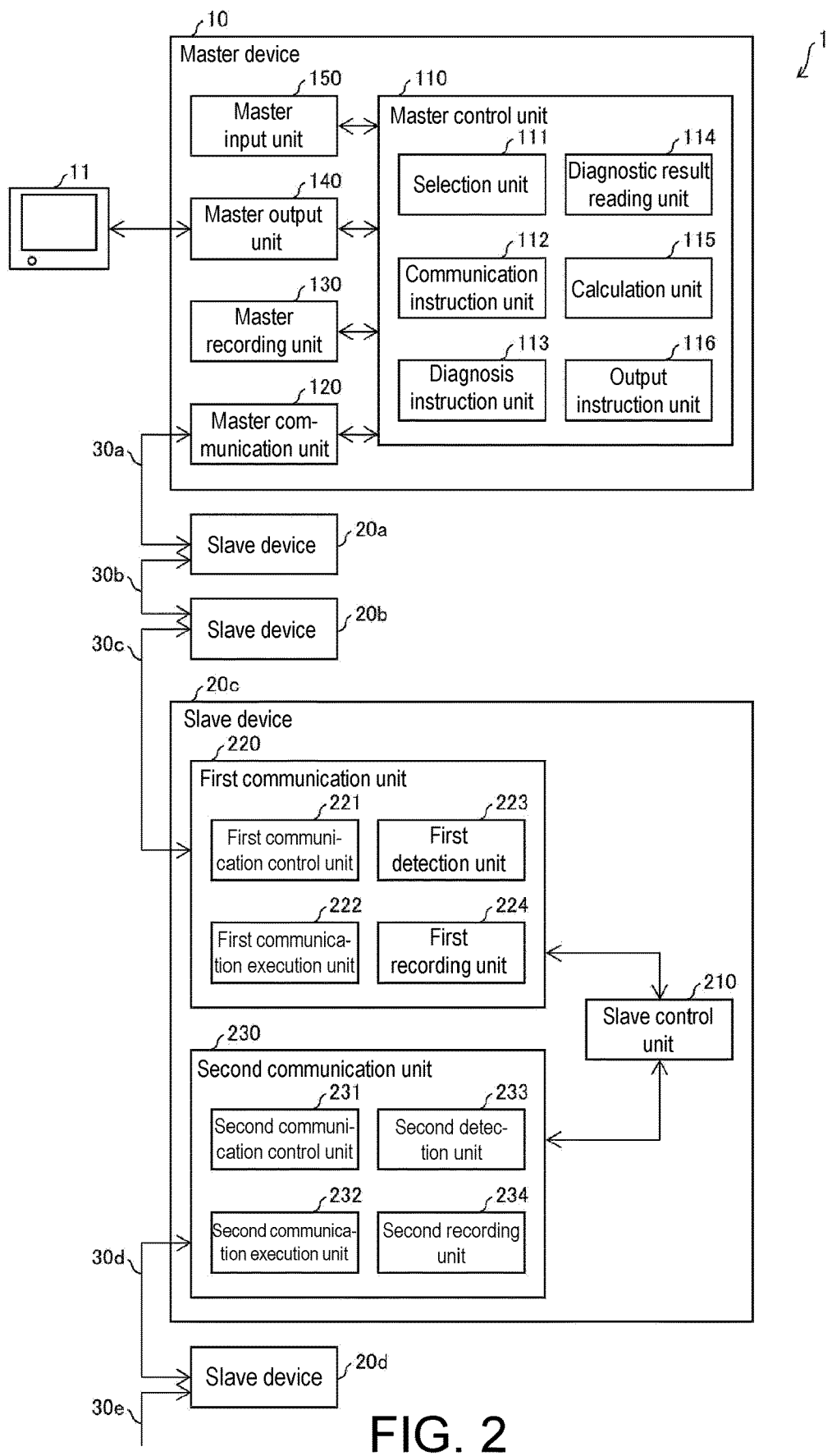
FIG. 2 is a block diagram illustrating a network system and the control device according to Embodiment 1 of the invention.

FIG. 2 is a block diagram illustrating a configuration of the master device 10 according to Embodiment 1 and the network system 1. The master device 10 (control device) includes a master control unit 110, a master communication unit 120, a master recording unit 130, a master output unit 140, and a master input unit 150.

The master communication unit 120 is a functional block performing communication with the multiple slave devices 20 (20a to 20d, etc.). The master recording unit 130 is a functional block performing recording, reading, and keeping of data. The master output unit 140 is an interface for displaying information on the display device 11. While FIG. 2 shows the display device 11 as the device displaying information, the computer 12 may also be such a device.

The master input unit 150 includes a user interface such as a switch or a touch panel, and receives an instruction or a selection of an operation due to the operation of the administrator. The master input unit 150 may not be required. In such case, for the instruction or the selection of the operation according to the operation of the administrator, the master device 10 may also be instructed by another apparatus such as the computer 12.

The master control unit 110 controls the functional blocks including the master communication unit 120. The master control unit 11 may execute processing of data obtained via the master communication unit 120, the master input unit 150, or from the master recording unit 130, and adjust the control according to the result thereof. In addition, the master control unit 110 may execute the processing of the data and display the result thereof on the display device 11 via the master output unit 140.

The master control unit 110 at least has respective functional blocks of a selection unit 111, a communication instruction unit 112, a diagnosis instruction unit 113, a diagnostic result reading unit 114, a calculation unit 115, and an output instruction unit 116. The functions of the functional blocks will be described afterwards.

(Configuration of Slave Device)

As an example, FIG. 2 illustrates that, in the order from the side of the master device 10, the slave devices 20a to 20d are connected in order by communication cables 30a to 30d. While the respective slave devices 20a to 20d have the same communication-related configuration, FIG. 2 only shows the configuration for the slave device 20c.

The slave device 20c includes a slave control unit 210, a first communication unit 220, and a second communication unit 230. The first communication unit 220 is connected to the slave device 20b, which is another device, via the communication cable 30c. The second communication unit 230 is connected to the slave device 20d, which is another device, via the communication cable 30d. That is, the first communication unit 220 is a communication unit on the master side (upstream side, IN side), and the second communication unit is a communication unit on the side (downstream side, OUT side) opposite to the master side. The first communication unit 220 and the second communication unit 230 are each a circuit referred to as PHY.

The slave control unit 210 is a functional block which may control functional blocks including the first communication unit 220 and the second communication unit 230. In addition, the slave control unit 210 performs execution of integration or information processing of various controls in the slave device 20c.

The first communication unit 220 is provided with various functional blocks including a first communication control unit 221, a first communication execution unit 222, a first detection unit 223, and a first recording unit 224. The first communication control unit 221 is a functional block integrating the entire first communication unit 220 and controls the communication performed by the first communication unit 220. The first communication execution unit 222 is a functional block executing communication packet exchange with the another device 20b via the communication cable 30c based on the instruction of the first communication control unit 221.

The first detection unit 223 is a functional block executing a breakdown diagnosis of the communication cable 30c based on the instruction of the first communication control unit 221. The first recording unit 224 is a register recording the result of the breakdown diagnosis obtained by the first detection unit 223. In the breakdown diagnosis, at least whether there is a breakdown and, in the case where there is a breakdown, the distance information relating to the length from the first communication unit 220 to the breakdown location in the communication cable 30c are detected.

At the time of executing the breakdown diagnosis, the first detection unit 223 transmits a specific signal waveform with respect to the connected communication cable 30c, and detects a reflected signal thereof. Accordingly, the first detection unit 223 detects the distance information relating to the length of the communication cable 30c until the breakdown location. In addition, a breakdown determination determining the state of the communication cable 30c, that is, any of normal, disconnection breakdown, and short breakdown may also be performed. When the first detection unit 223 executes the breakdown diagnosis, the result thereof is recorded in the first recording unit 224.

The second communication unit 230 is provided with various functional blocks including a second communication control unit 231, a second communication execution unit 232, a second detection unit 233, and a second recording unit 234. The second communication control unit 231 is a functional block integrating the entire second communication unit 230 and controls the communication performed by the second communication unit 230. The second communication execution unit 232 is a functional block executing communication packet exchange with the another device 20d via the communication cable 30d based on the instruction of the second communication control unit 231.

The second detection unit 233 is a functional block executing a breakdown diagnosis of the communication cable 30d based on the instruction of the second communication control unit 231. The second recording unit 234 is a register recording the result of the breakdown diagnosis obtained by the second detection unit 233. In the breakdown diagnosis, at least the distance information relating to the length from the second communication unit 230 to the breakdown location in the communication cable 30d is detected.

At the time of executing the breakdown diagnosis, the second detection unit 233 transmits a specific signal waveform with respect to the connected communication cable 30d, and detects a reflected signal thereof. Accordingly, the second detection unit 233 detects the distance information relating to the length of the communication cable 30d until the breakdown location. In addition, a breakdown determination determining the state of the communication cable 30d, that is, any of normal, disconnection breakdown, and short breakdown, may also be performed. When the second detection unit 233 executes the breakdown diagnosis, the result thereof is recorded in the second recording unit 234.

3. Operation Example

When the network system 1, which is an FA system, is in operation, the master device 10 performs communication relating to control and data collection, etc., of each device with the respective slave devices 20. Furthermore, in Embodiment 1, the master device 10 repetitively executes the following characteristic operations for monitoring the communication cables 30.

Figure 3:
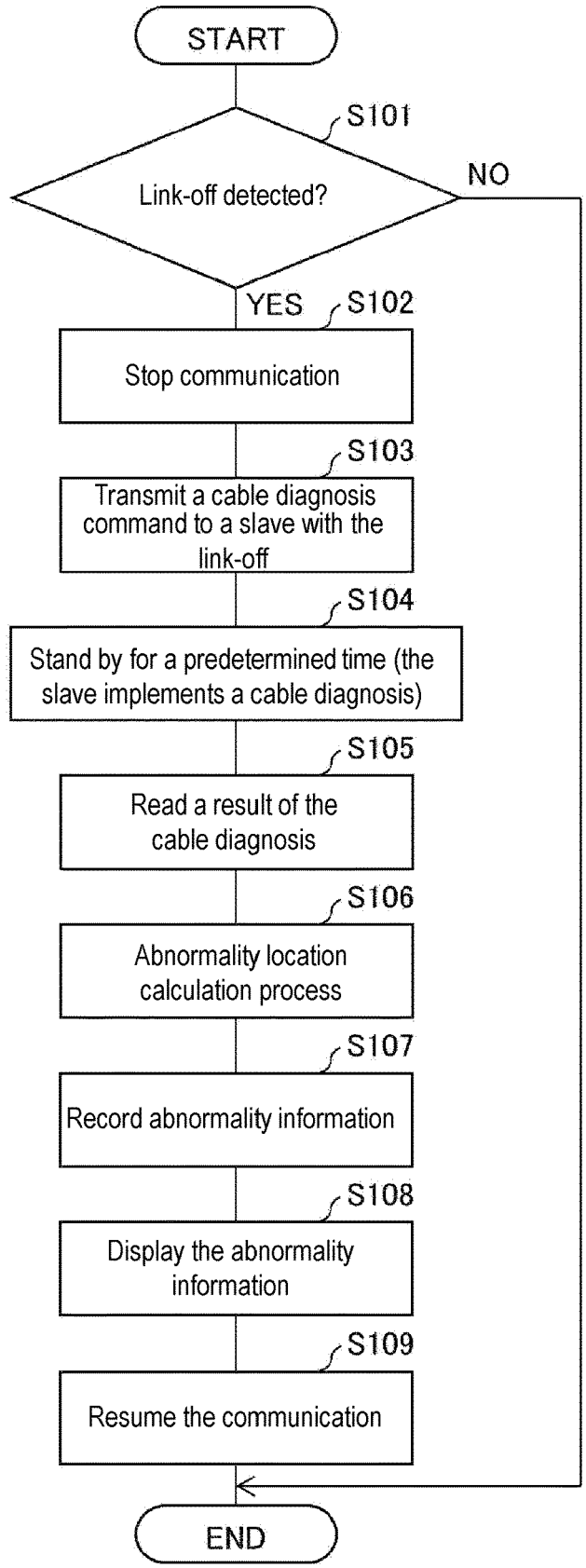
FIG. 3 is a flowchart illustrating an operation of the control device according to Embodiment 1 of the invention.
Figure 4:
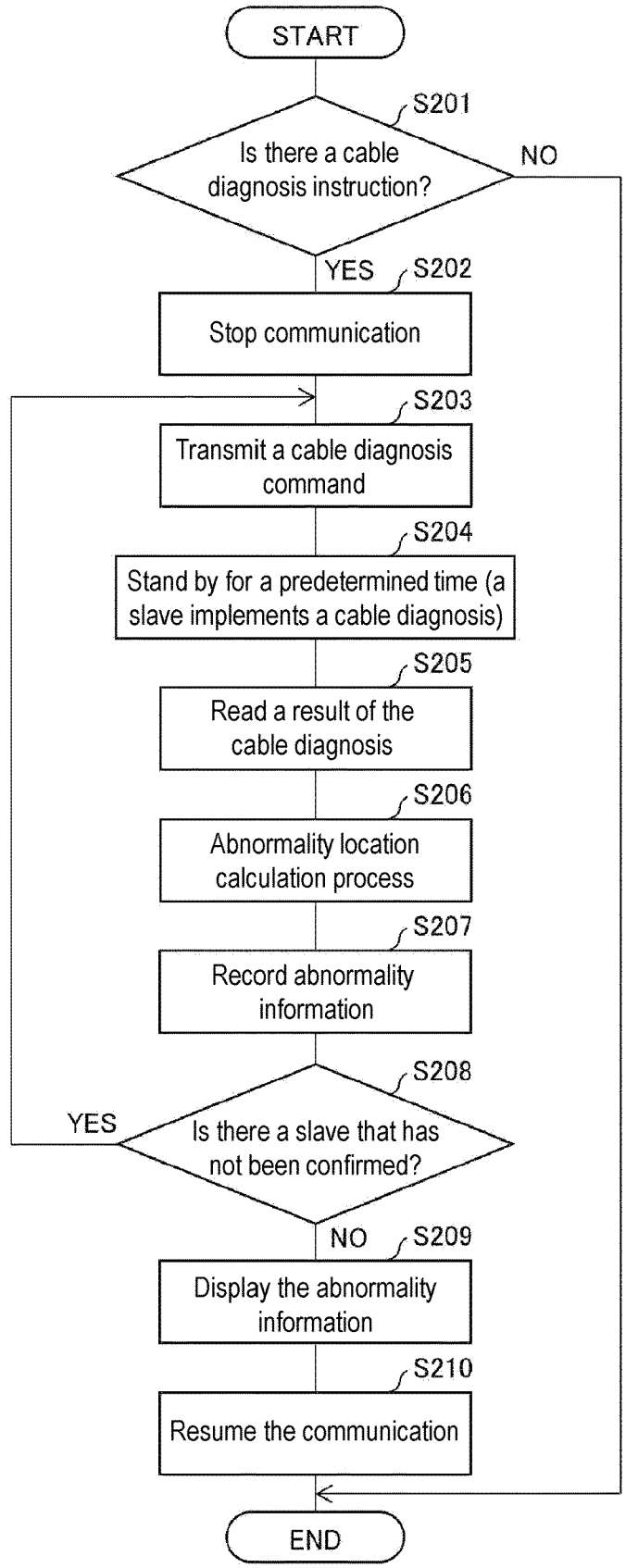
FIG. 4 is a flowchart illustrating an operation of a control device according to Embodiment 2 of the invention.

FIG. 3 is a flowchart illustrating the characteristic operations for monitoring the communication cables 30 executed by the master device 10. When the network system 1 is in operation, the master device 10 repetitively executes the flow from Step S101 to Step S109 in the following.

Step S101: The selection unit 111 monitors whether the link-off information indicating that the communication with another device from the slave device 20 (20a to 20d) is disrupted is notified of via the master communication unit 120. The link-off information to the master device 10 is generally informed from the slave device 20 located on the master side (upstream side) among the slave devices 20 directly connected to each other. This is because the information from the slave device 20 on the downstream side does not go up to the master device 10 due to the disruption of communication. In the case where the link-off information is detected (YES in S101), the flow proceeds to Step S102; otherwise (NO in Step S101), the flow ends.

Step S102: The selection unit 111 selects the slave device 20 notifying of the link-off information. In the operation example, it is described that the slave device 20c shown in FIG. 2 is set as the slave device 20, and link-off occurs on the side of the second communication unit (OUT side) thereof. The communication instruction unit 112 instructs the selected slave device 20c to stop the communication using the second communication unit 230.

Then, in the slave device 20c, the second communication control unit 231 stops the communication (trial of communication) with the slave device 20d by the second communication execution unit 232.

Step S103: Then, the diagnosis instruction unit 113 instructs the selected slave device 20c to execute a cable diagnosis from the second communication unit 230.

Step S104: Then, the master control unit 110 stands by for a predetermined time.

During this time, in the slave device 20c, the second communication control unit 231 executes, by the second detection unit 233, a breakdown diagnosis of the communication cable 30d. The second detection unit 233 keeps the result of the breakdown diagnosis of the communication cable 30d in the second recording unit 234.

Step S105: Then, the diagnostic result reading unit 114 reads out the result of the breakdown diagnosis of the communication cable 30d from the second recording unit 234 of the selected slave device 20c.

Step S106: Then, the calculation unit 115 analyzes the result of the breakdown diagnosis. The state of the communication cable 30d, that is, any of normal, disconnection breakdown, and short breakdown, is obtained. Moreover, the calculation unit 115 refers to the distance information of the result of the breakdown diagnosis, and converts the distance information into an actual distance on the communication cable 30d.

Step S107: Then, the calculation unit 115 records calculated abnormality information in the master recording unit 130. Here, the abnormality information may include the information of the selected slave device 20c, the information of the communication unit (first communication unit or second communication unit) implementing the cable diagnosis, information of disconnection breakdown/short breakdown/normal state, the information of the actual distance to the breakdown location, the time information, etc.

Step S108: Then, the output instruction unit 116 displays the abnormality information on the display device 11 via the master output unit 140.

Step S109: Then, the communication instruction unit 112 instructs the selected slave device 20c to start communication using the second communication unit 230. If the disruption of communication is temporary, the actual communication may be resumed, and in the case where the disruption continues, the actual communication may not be resumed. It is noted that, prior to Step S109, the instruction of starting the communication may also be transmitted after the operation of a resuming instruction by the administrator is received. Then, the flow ends.

4. Functions, Effects

According to Embodiment 1, since the master device 10 reads and informs the result of the breakdown diagnosis of the communication cable 30d from the slave device 20c, the administrator of the network system 1 does not confirm each of the slave devices 20, and can easily recognize the occurrence of a cable abnormality.

Moreover, since the breakdown location of the communication cable 30d on which the abnormality occurs is indicated as the distance from the slave device 20, the location where the cable abnormality occurs can be learned easily. The length of the communication cable 30 connecting between apparatuses in the industrial network may sometimes be as long as 100 m.

In such case, it is not economical to replace the entire communication cable on which a breakdown occurs. Therefore, for example, communication cables of 20 m are connected by a connector to serve as one longer communication cable. In such case, according to the master device 10 according to Embodiment 1, since the place where the abnormality occurs is specified, it suffices to replace only the communication cable of 20 m, for example, which includes the breakdown location, and the maintenance of the network system 1 can be performed economically.

Moreover, since the breakdown location is specified uniquely, the administrator can easily learn at which place in the factory a breakdown of the communication cable occurs. There are various situations in the factory where there is a risk of damaging the communication cable, for example, as follows: the communication cable being disposed along a movable portion such as a robot arm or a movable stage, and a stress occurring due to movement; being disposed at a place receiving vibration or pressure; being disposed at a place where the temperature changes; being disposed to sparks and high or low temperature; being disposed to chemical substances such as drugs or gas.

If it is identified that the breakdown occurs at a specific position of the communication cable, the administrator can easily find out in the field which of the factors causing these cable abnormalities in the factory actually causes the breakdown. Accordingly, it is easy to take countermeasures so that the same breakdown does not occur in the next time.

Therefore, it is possible for the administrator of the network system to remove and replace the location where the cable abnormality occurs in the field network and efficiently execute maintenance work such as specifying and taking countermeasures against the place where cable abnormalities tend to occur.

In addition, according to Embodiment 1, at the time when there is a risk that a communication cable breakdown occurs, the master device 10 automatically implements a cable diagnosis and informs the result thereof. Accordingly, since the administrator of the network system 1 can immediately learn at which place of the network system 1 the breakdown occurs, without noticing the breakdown of the communication cable and leaving it unattended, it is possible to take prompt repair actions.

However, in the invention, the configuration of automatically implementing the cable diagnosis at the time of receiving the link-off information from the slave device 20 may not be required. In the flowchart of FIG. 3, it may also be configured that when receiving the link-off information (YES in Step S101), the master device 10 so informs the administrator and, after receiving the instruction of the administrator, proceeds to Step S102 and implements the cable diagnosis. Whether the diagnosis is implemented automatically at the time when the link-off information is received from the slave device 20 may be set arbitrarily in the master device 10 by the selection of the administrator.

According to Embodiment 1, since the master device 10 causes the slave device to stop communication and implement the cable diagnosis, at the time when the slave device executes the cable diagnosis, the result of the cable diagnosis can be prevented from being incorrect due to interference with communication. In addition, since the master device 10 reads out the information of the recording unit of the slave device after standing by for a predetermined time which completes the cable diagnosis after instructing to execute the cable diagnosis, the communication from the master device 10 can be prevented from interfering with the cable diagnosis and making the result of the cable diagnosis incorrect.

It is noted that, in Embodiment 1, regarding the series of operations from Step S102 to Step S109 of the flowchart of the operations executed by the master device 10, it is possible to configure so that the administrator can directly connect the computer 12 (tool) in which the program for execution. In such case, the abnormality information may be displayed in Step S108 on a display provided in the computer 12.

Embodiment 2

Another embodiment of the invention will be described in the following. For the convenience of description, the components having the same functions as the components described in the above embodiment are labeled with the same symbols, and the descriptions thereof will not be repeated.

The configuration of the master device 10 (control device) according to Embodiment 2 is the same as the case of Embodiment 1 shown in FIG. 2. In addition, the configuration of the network system 1 for which the master device 10 according to Embodiment 2 is suitable is the same as the case of Embodiment 1 shown in FIGS. 1 and 2.

Figure 5:
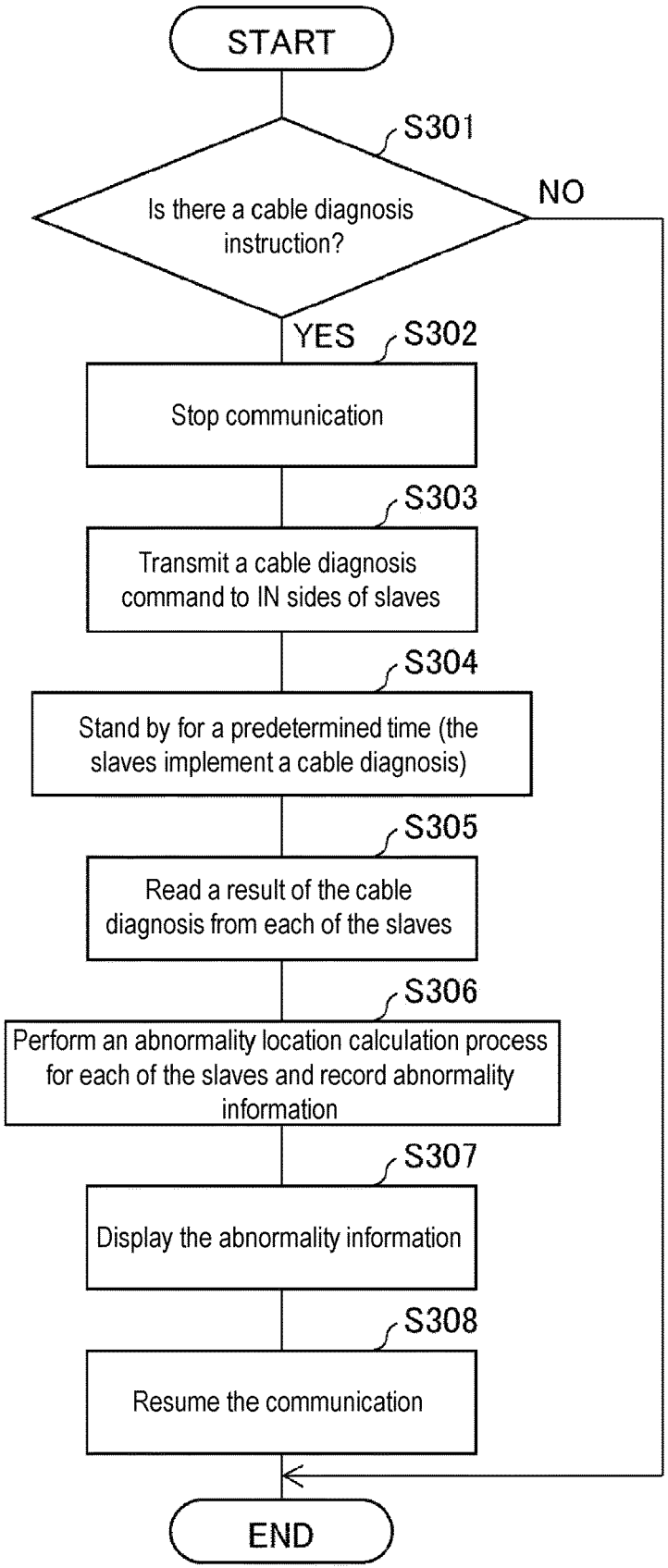
FIG. 5 is a flowchart illustrating an operation of a control device according to Embodiment 3 of the invention.

Other characteristic operations which the master device 10 may execute and which are shown in the flowchart of FIG. 5 are described in Embodiment 2. When the network system 1 is in operation, the master device 10 repetitively executes the flow from Step S201 to Step S210 in the following.

Step S201: The master input unit 150 receives an instruction of the cable diagnosis by the administrator. In the case where the instruction of the cable diagnosis is detected (YES in S201), the flow proceeds to Step S202; otherwise (NO in Step S201), the flow ends.

Step S202: The selection unit 111 selects the slave devices 20 in a range where the cable diagnosis is performed according to the instruction of the administrator received by the master input unit 150 in Step S201. Here, as an example, the slave devices 20 refer to all the slave devices 20 since the slave device 20*a* in FIG. 2 (the downstream side from the slave device 20*a*). The communication unit 112 instructs the selected slave devices 20 (since 20*a*) to stop the communication using the first communication units 220 (communication units on the IN side) and the second communication units 230 (communications on the OUT side). Then, in the selected slave devices 20, the communication with other connected devices in the first communication units 220 and the second communication units 230 is stopped.

Step S203: Then, the selection unit 111 selects one slave device not selected in Step S203 among the slave devices 20 selected in Step S202. The diagnosis instruction unit 113 instructs the slave device 20 selected here to execute the cable diagnosis from the first communication unit 220 and the second communication unit 230.

Step S204: Then, the master control unit 110 stands by for a predetermined time. During this time, in the selected slave device 20, the first detection unit 223 (detection unit of the communication unit on the IN side) and the second detection unit 233 (the detection unit of the communication unit on the OUT side) execute the breakdown diagnosis of the communication cables 30. The first detection unit 223 keeps the result of the breakdown diagnosis of the connected communication cable 30 in the first recording unit 224. The second detection unit 233 keeps the result of the breakdown diagnosis of the connected communication cable 30 in the second recording unit 234.

Step S205: Then, the diagnostic result reading unit 114 reads out the result of the breakdown diagnosis of the communication cables 30 from the first recording unit 224 and the second recording unit 234 of the selected slave device 20.

Step S206: Then, the calculation unit 115 respectively analyzes the result of the breakdown diagnosis by the first detection unit 223 and the second detection unit 233. The state of the communication cable 30, that is, any of normal, disconnection breakdown, and short breakdown, is obtained. Moreover, the calculation unit 115 refers to the distance information of the result of the breakdown diagnosis, and converts the distance information into the actual distance on the communication cable 30.

Step S207: Then, the calculation unit 115 records calculated abnormality information in the master recording unit 130. Here, the abnormality information may include the information of the selected slave device 20, the information of the communication unit (first communication unit 220 or second communication unit 230) implementing the cable diagnosis, information of disconnection breakdown/short breakdown/normal state, the information of the actual distance to the breakdown location, the time information, etc.

Step S208: Then, the selection unit 111 determines whether there is a remaining slave device not selected in Step S203 among the slave devices 20 selected in Step S202. In the case where the selection unit 111 determines that there is a remaining slave device (YES in S208), the flow proceeds to Step S203; otherwise (NO in S208) the flow proceeds to Step S209.

Step S209: Then, the output instruction unit 116 displays the abnormality information on the display device 11 via the master output unit 140.

Step S210: Then, the communication instruction unit 112 instructs the selected slave devices 20 to resume communication using the respective communication units (the first communication units 220, the second communication unit 230s). Then, in each of the selected slave devices 20, the communication with other connected devices using the first communication unit 222 and the second communication unit 232 resumes. Then, the flow ends.

In the above flow, as a means for the administrator to instruct execution of the cable diagnosis in Step S201, the master device 10 may also include an element such as a switch. Alternatively, the instruction may also be made via the computer 12 (tool) or another apparatus.

In the above flow, there may be various cases for the range of the target slave devices 20 instructed by the administrator in Step S201. For example, the range may also begin from the slave device 20c (the slave devices on the downstream side from the slave device 20c) in FIG. 2. Or, the range may also be the slave devices 20 on a branch of the network system 1 shown in FIG. 1.

In the above flow, the slave devices 20 selected in Step S203 may be selected chronologically in the order of 20a, 20b, and 20c from the master side, and may also be selected in a reversed order thereof.

In the above flow, the breakdown diagnosis of the communication cables 30 executed in Step S204 is performed on the IN side (first communication unit 220) and the OUT side (second communication unit 230) of each slave device 20. However, the breakdown diagnosis may also be performed only on the IN side and may also be performed only on the OUT side.

Except for the effects resulting from that the master device 10 automatically implements the cable diagnosis when there is a risk that a cable breakdown may occur in Embodiment 1, the same effects in the case of Embodiment 1 can also be obtained in Embodiment 2.

Moreover, according to Embodiment 2, a cable diagnosis for a desired range of the network system 1 can be executed at the initiative of the administrator. Accordingly, a cable diagnosis can be arbitrarily executed when the network system 1 is in operation. Specifically, by executing the cable diagnosis at the time of setting or changing the network system 1, the administrator can easily verify whether a problem occurs in the communication cables.

According to Embodiment 2, since the slave devices 20 execute the cable diagnosis one after another in order in the repetition from Steps S203 to S208 of the above flow according to the instruction of the master device 10, multiple slave devices are prevented from simultaneously executing the cable diagnosis and interfering with each other and making the result of the cable diagnosis incorrect.

Embodiment 3

The configuration of the master device 10 (control device) according to Embodiment 3 is the same as the case of Embodiment 1 shown in FIG. 2. In addition, the configuration of the network system 1 for which the master device 10 according to Embodiment 2 is suitable is the same as the case of Embodiment 1 shown in FIGS. 1 and 2.

Other characteristic operations which the master device 10 may execute and which are shown in the flowchart of FIG. 5 are described in Embodiment 3. When the network system 1 is in operation, the master device 10 repetitively executes the flow from Step S301 to Step S308 in the following.

Step S301: The master input unit 150 receives an instruction of the cable diagnosis by the administrator. In the case where the instruction of the cable diagnosis is detected (YES in S301), the flow proceeds to Step S302; otherwise (NO in Step S301), the flow ends.

Step S302: The selection unit 111 selects the slave devices 20 in a range where the cable diagnosis is performed according to the instruction of the administrator received by the master input unit 150 in Step S301. Here, as an example, the slave devices 20 refer to all the slave devices 20 since the slave device 20a in FIG. 2 (the downstream side from the slave device 20a). The communication instruction unit 112 instructs the selected slave devices 20 (since 20a) to stop the communication using each communication unit. Then, in the selected slave devices 20, the communication with other connected devices in the first communication units 220 and the second communication units 230 is stopped.

Step S303: Then, the diagnosis instruction unit 113 instructs the selected slave devices 20 to execute a cable diagnosis from the first communication units 220 (communication units on the IN side).

Step S304: Then, the master control unit 110 stands by for a predetermined time.

During this time, in the selected slave devices 20, each of the first detection units 223 (detection unit of the communication unit on the IN side) executes the breakdown diagnosis of the communication cable 30. Each of the first detection units 223 keeps the result of the breakdown diagnosis of the communication cable 30 in each of the first recording units 224.

Step S305: Then, the diagnostic result reading unit 114 reads out the result of the breakdown diagnosis of the communication cables 30 from the first recording units 224 of the selected slave devices 20.

Step S306: Then, the calculation unit 115 analyzes the result of the breakdown diagnosis. The state of the communication cable 30, that is, any of normal, disconnection breakdown, and short breakdown, is obtained. Moreover, in the case of the disconnection breakdown or the short breakdown, the calculation unit 115 refers to the distance information of the result of the breakdown diagnosis, and converts the distance information into the actual distance on the communication cable 30.

Step S307: Then, the calculation unit 115 records calculated abnormality information in the master recording unit 130. Here, the abnormality information may include the information of the selected slave devices 20, the information of the communication unit (first communication unit 220) implementing the cable diagnosis, information of disconnection breakdown/short breakdown/normal state, the information of the actual distance to the abnormality location, the time information, etc.

Step S308: Then, the output instruction unit 116 displays the abnormality information on the display device 11 via the master output unit 140.

Step S309: Then, the communication instruction unit 112 instructs the selected slave devices 20 selected in Step S302 to execute communication using the respective communication units (the first communication units 220, the second communication units 230). Then, in each of the selected slave devices 20, the communication with other connected devices using the first communication unit 222 and the second communication unit 232 resumes. Then, the flow ends.

In the above flow, as a means for the administrator to instruct execution of the cable diagnosis in Step S301, an element such as a switch included in the master device 10 may also be adopted. Alternatively, the instruction may also be made via the computer 12 (tool) or another apparatus.

In the above flow, there may be various cases for the range of the target slave devices 20 instructed by the administrator in Step S301. For example, the range may also begin from the slave device 20c (the slave devices on the downstream side than the slave device 20b) in FIG. 2. Or, the range may also be the slave devices 20 on a branch of the network system 1 shown in FIG. 1.

In the above flow, the breakdown diagnosis of the communication cables 30 executed in Step S304 is performed on the IN side (first communication unit 220) of each slave device 20. However, the breakdown diagnosis may also be performed on the OUT side (second communication unit).

Except for the effects resulting from that the master device 10 automatically implements the cable diagnosis when there is a risk that a cable breakdown may occur in Embodiment 1, the same effects in the case of Embodiment 1 can also be obtained in Embodiment 3.

Moreover, according to Embodiment 3, a cable diagnosis for a desired range of the network system 1 can be executed at the initiative of the administrator. Accordingly, a cable diagnosis can be arbitrarily executed when the network system 1 is in operation. Specifically, by executing the cable diagnosis at the time of setting or changing the network system 1, the administrator can easily verify whether a problem occurs in the communication cables 30.

According to Embodiment 3, in Step S304 of the flow, since the cable diagnosis is executed only on the IN side (upstream side) (or only on the OUT side) of each of the slave devices according to the instruction of the master device 10, even if multiple slave devices 20 simultaneously execute the cable diagnosis, the slave devices 20 are prevented from interfering with each other to make the result of the cable diagnosis incorrect.

[Example of Implementation by Software]

The functional blocks (specifically, the master control unit 110) of the control device (master device 10) may be realized by logic circuits (hardware) formed by integrated circuits (IC chips), etc., and may also be realized by software.

In the latter case, the control device includes a computer for executing the command of the program which is the software for implementing the respective functions. The computer, for example, includes one or more processors, and includes a computer-readable recording medium storing the program. Then, in the computer, the processor reads the program from the recording medium and executes the program, thereby achieving the objective of the invention.

As the processor, for example, a central processing unit (CPU) can be used. As the recording medium, a "non-temporary tangible medium", such as a read only memory (ROM), etc., a tape, a disk, a card, a semiconductor memory, a programmable logic circuit, etc., can be used. Moreover, a random access memory (RAM) for expanding the program may also be further provided. In addition, the program may also be supplied to the computer via any transmittable arbitrary transmission medium (communication network, broadcast waves, etc.). According to an aspect of the invention, the program may also be realized in a form of data signals embedded in carrier waves and embodied by electronic transmission.

SUMMARY

A control device according to an aspect of the invention is suitable for a network system including a master device and a plurality of slave devices. The control device is the master device. The slave device includes: a first communication unit connected with a first another device on a side of the master device by a first communication cable and a second communication unit connected with a second another device on a side opposite to the master device by a second communication cable. The slave device further has: a first detection unit and a first recording unit, provided in the first communication unit, wherein the first detection unit performs a breakdown diagnosis comprising detection of a breakdown location of the first communication cable, and the first recording unit keeps a result of the breakdown diagnosis performed by the first detection unit; and a second detection unit and a second recording unit, provided in the second communication unit, wherein the second detection unit performs a breakdown diagnosis comprising detection of a breakdown location of the second communication cable, and the second recording unit keeps a result of the breakdown diagnosis performed by the second detection unit. The control device includes: a communication instruction unit, instructing the slave device to execute/stop communication with the first another device or the second another device; a diagnosis instruction unit, instructing the slave device to implement the breakdown diagnosis of the first communication cable or the second communication cable; a diagnostic result reading unit, reading out a result of the breakdown diagnosis from the first recording unit or the second recording unit of the slave device; and a calculation unit, calculating a length of the first communication cable or the second communication cable from the slave device to the breakdown location from the result of the breakdown diagnosis that is read out.

According to the above configuration, a master device with which the administrator can easily specify a breakdown location of a communication cable in an industrial network system, thereby making it possible to efficiently perform maintenance work on the communication cable can be realized.

The control device according the above aspect may include a configuration in which, when receiving link-off information of the communication with the second another device from the slave device, the control device instructs, by the diagnosis instruction unit, the slave device to implement the breakdown diagnosis of the second communication cable.

According to the above configuration, since the administrator can immediately learn at which place of the network system the breakdown occurs, without not noticing the cable breakdown and leaving it unattended, it is possible to take prompt repair actions.

The control device according to the above aspect may also include a configuration in which an instruction of implementing the breakdown diagnosis of the first communication cable or the second communication cable by the diagnosis instruction unit is performed after an instruction of stopping the communication with the first another device or the second another device by using the communication cable by the communication instruction unit.

According to the above configuration, the breakdown diagnosis of the communication cable by the detection unit of the slave device can be executed without causing interference with the communication in the network system.

The control device according to the above aspect may include a configuration in which read-out of the result of the breakdown diagnosis by the diagnostic result reading unit is performed after a predetermined time from a time when the communication instruction unit instructs to implement the breakdown diagnosis.

According to the above configuration, the breakdown diagnosis of the communication cable by the detection unit of the slave device can be executed without causing interference with the communication in the network system.

The control device according to the above aspect may include a configuration in which the breakdown diagnosis performed by the first detection unit further executes a determination on whether the first communication cable is in any of a disconnection breakdown, a short breakdown, and normality, and the breakdown diagnosis performed by the second detection unit further executes a determination on whether the second communication cable is in any of a disconnection breakdown, a short breakdown, and normality.

According to the above configuration, in addition to specifying the breakdown location of the communication cable in the industrial network system, the administrator can recognize the type of the breakdown which occurs, and can more accurately take measures for the maintenance of the communication cable.

A network system according to an aspect of the invention is a network system including a master device and a plurality of slave devices. The slave device includes: a first communication unit connected with a first another device on a side of the master device by a first communication cable and a second communication unit connected with a second another device on a side opposite to the master device by a second communication cable. The slave device further has: a first detection unit and a first recording unit, provided in the first communication unit, wherein the first detection unit performs a breakdown diagnosis comprising detection of a breakdown location of the first communication cable, and the first recording unit keeps a result of the breakdown diagnosis performed by the first detection unit; and a second detection unit and a second recording unit, provided in the second communication unit, wherein the second detection unit performs a breakdown diagnosis comprising detection of a breakdown location of the second communication cable, and the second recording unit keeps a result of the breakdown diagnosis performed by the second detection unit. The master device includes: a communication instruction unit, instructing the slave device to execute/stop communication with the first another device or the second another device; a diagnosis instruction unit, instructing the slave device to implement the breakdown diagnosis of the first communication cable or the second communication cable; a diagnostic result reading unit, reading out a result of the breakdown diagnosis from the first recording unit or the second recording unit of the slave device; and a calculation unit, calculating a length of the first communication cable or the second communication cable from the slave device to the breakdown location from the result of the breakdown diagnosis that is read out.

According to the above configuration, a network system with which the administrator can easily specify a breakdown location of a communication cable in an industrial network system, thereby making it possible to efficiently perform maintenance work on the communication cable can be realized.

A control method of a network system according to an aspect of the invention is suitable for a network system including a master device and a plurality of slave devices. The slave device includes: a first communication unit connected with a first another device on a side of the master device by a first communication cable and a second communication unit connected with a second another device on a side opposite to the master device by a second communication cable. The slave device further has: a first detection unit and a first recording unit, provided in the first communication unit, wherein the first detection unit performs a breakdown diagnosis comprising detection of a breakdown location of the first communication cable, and the first recording unit keeps a result of the breakdown diagnosis performed by the first detection unit; and a second detection unit and a second recording unit, provided in the second communication unit, wherein the second detection unit performs a breakdown diagnosis comprising detection of a breakdown location of the second communication cable, and the second recording unit keeps a result of the breakdown diagnosis performed by the second detection unit. The control method includes: a step of instructing the slave device to stop communication with the first another device or the second another device; a step of instructing the slave device to implement the breakdown diagnosis of a communication cable in which the communication in the first communication cable or the second communication cable is stopped; a step of reading out a result of the breakdown diagnosis from the first recording unit or the second recording unit of the slave device after a predetermined time from the step of instructing to implement the breakdown diagnosis; and a step of calculating a length of the first communication cable or the second communication cable from the slave device to the breakdown location from the result of the breakdown diagnosis that is read out.

According to the above configuration, a control device with which the administrator can easily specify a breakdown location of a communication cable in an industrial network system, thereby making it possible to efficiently perform maintenance work on the communication cable can be realized.

A control program according to an aspect of the invention includes a configuration which causes a control device to function by causing the control device to execute the steps in the control method according to the above aspect.

According to the above configuration, a control device with which the administrator can easily specify a breakdown location of a communication cable in an industrial network system, thereby making it possible to efficiently perform maintenance work on the communication cable can be realized.

The invention is not limited to the respective embodiments and examples described above, and various modifications can be made within the scope of the claims. The technical scope of the invention also includes embodiments obtained by appropriately combining the technical means disclosed in the different embodiments and examples.

What is claimed is:

1. A control device, suitable for a network system comprising a master device and a plurality of slave devices, the control device being the master device,
    wherein each of the plurality of slave devices comprises:
    a first communication unit connected with a first another device on a side of the master device by a first communication cable and a second communication unit connected with a second another device on a side opposite to the master device by a second communication cable, and further has:
    a first detection unit and a first recording unit, provided in the first communication unit, wherein the first detection unit is configured to perform a breakdown diagnosis comprising detection of a breakdown location of the first communication cable, and the first recording unit is configured to keep a result of the breakdown diagnosis performed by the first detection unit; and
    a second detection unit and a second recording unit, provided in the second communication unit, wherein the second detection unit is configured to perform a breakdown diagnosis comprising detection of a breakdown location of the second communication cable, and the second recording unit is configured to keep a result of the breakdown diagnosis performed by the second detection unit; and
    the control device comprises:
    a processor configured to:
    select a slave device from the plurality of slave devices in response to the control device receiving link-off information from the slave device;
    instruct the slave device to execute/stop communication with the first another device or the second another device, wherein the processor is configured to instruct the slave device to stop communication with the second another device in response to the received link-off information indicating that communication with the second another device from the slave device is disrupted;
    instruct the slave device to implement the breakdown diagnosis of the first communication cable or the second communication cable;
    read out a result of the breakdown diagnosis from the first recording unit or the second recording unit of the slave device; and
    calculate a length of the first communication cable or the second communication cable from the slave device to the breakdown location from the result of the breakdown diagnosis that is read out.

2. The control device as claimed in claim 1, wherein when receiving link-off information of the communication with the second another device from the slave device,
    the control device instructs, by the processor, the slave device to implement the breakdown diagnosis of the second communication cable.

3. The control device as claimed in claim 2, wherein an instruction of implementing the breakdown diagnosis of the first communication cable or the second communication cable by the processor is performed after an instruction of stopping the communication with the first another device or the second another device by using the communication cable by the processor.

4. The control device as claimed in claim 2, wherein read-out of the result of the breakdown diagnosis by the processor is performed after a predetermined time from a time when the processor instructs to implement the breakdown diagnosis.

5. The control device as claimed in claim 2, wherein the breakdown diagnosis performed by the first detection unit further executes a determination on whether the first communication cable is in any of a disconnection breakdown, a short breakdown, and normality, and
    the breakdown diagnosis performed by the second detection unit further executes a determination on whether the second communication cable is in any of a disconnection breakdown, a short breakdown, and normality.

6. The control device as claimed in claim 1, wherein an instruction of implementing the breakdown diagnosis of the first communication cable or the second communication cable by the processor is performed after an instruction of stopping the communication with the first another device or the second another device by using the communication cable by the processor.

7. The control device as claimed in claim 6, wherein read-out of the result of the breakdown diagnosis by the processor is performed after a predetermined time from a time when the processor instructs to implement the breakdown diagnosis.

8. The control device as claimed in claim 6, wherein the breakdown diagnosis performed by the first detection unit further executes a determination on whether the first communication cable is in any of a disconnection breakdown, a short breakdown, and normality, and
    the breakdown diagnosis performed by the second detection unit further executes a determination on whether the second communication cable is in any of a disconnection breakdown, a short breakdown, and normality.

9. The control device as claimed in claim 1, wherein read-out of the result of the breakdown diagnosis by the processor is performed after a predetermined time from a time when the processor instructs to implement the breakdown diagnosis.

10. The control device as claimed in claim 9, wherein the breakdown diagnosis performed by the first detection unit further executes a determination on whether the first communication cable is in any of a disconnection breakdown, a short breakdown, and normality, and
    the breakdown diagnosis performed by the second detection unit further executes a determination on whether the second communication cable is in any of a disconnection breakdown, a short breakdown, and normality.

11. The control device as claimed in claim 1, wherein the breakdown diagnosis performed by the first detection unit further executes a determination on whether the first communication cable is in any of a disconnection breakdown, a short breakdown, and normality, and the breakdown diagnosis performed by the second detection unit further executes a determination on whether the second communication cable is in any of a disconnection breakdown, a short breakdown, and normality.

12. A network system, comprising a master device and a plurality of slave devices, wherein each of the plurality of slave devices comprises:
a first communication unit connected with a first another device on a side of the master device by a first communication cable and a second communication unit connected with a second another device on a side opposite to the master device by a second communication cable, and further has:
a first detection unit and a first recording unit, provided in the first communication unit, wherein the first detection unit is configured to perform a breakdown diagnosis comprising detection of a breakdown location of the first communication cable, and the first recording unit is configured to keep a result of the breakdown diagnosis performed by the first detection unit; and
a second detection unit and a second recording unit, provided in the second communication unit, wherein the second detection unit is configured to perform a breakdown diagnosis comprising detection of a breakdown location of the second communication cable, and the second recording unit is configured to keep a result of the breakdown diagnosis performed by the second detection unit; and the master device comprises:
a processor configured to:
select a slave device from the plurality of slave devices in response to the control device receiving link-off information from the slave device;
instruct the slave device to execute/stop communication with the first another device or the second another device, wherein the processor is configured to instruct the slave device to stop communication with the second another device in response to the received link-off information indicating that communication with the second another device from the slave device is disrupted;
instruct the slave device to implement the breakdown diagnosis of the first communication cable or the second communication cable;
read out a result of the breakdown diagnosis from the first recording unit or the second recording unit of the slave device; and
calculate a length of the first communication cable or the second communication cable from the slave device to the breakdown location from the result of the breakdown diagnosis that is read out.

13. A control method of a network system, suitable for a network system comprising a master device and a plurality of slave devices, wherein each of the plurality of slave devices comprises:
a first communication unit connected with a first another device on a side of the master device by a first communication cable and a second communication unit connected with a second another device on a side opposite to the master device by a second communication cable, and further has:
a first detection unit and a first recording unit, provided in the first communication unit, wherein the first detection unit is configured to perform a breakdown diagnosis comprising detection of a breakdown location of the first communication cable, and the first recording unit is configured to keep a result of the breakdown diagnosis performed by the first detection unit; and
a second detection unit and a second recording unit, provided in the second communication unit, wherein the second detection unit is configured to perform a breakdown diagnosis comprising detection of a breakdown location of the second communication cable, and the second recording unit is configured to keep a result of the breakdown diagnosis performed by the second detection unit; and the control method comprises:
causing a processor provided in the master device to perform:
a step of selecting a slave device from the plurality of slave devices in response to the master device receiving link-off information from the slave device;
a step of instructing the slave device to stop communication with the first another device or the second another device, wherein the step of instructing the slave device to stop communication comprises a step of instructing the slave device to stop communication with the second another device in response to the received link-off information indicating that communication with the second another device from the slave device is disrupted;
a step of instructing the slave device to implement the breakdown diagnosis of a communication cable in which the communication in the first communication cable or the second communication cable is stopped;
a step of reading out a result of the breakdown diagnosis from the first recording unit or the second recording unit of the slave device after a predetermined time from the step of instructing to implement the breakdown diagnosis; and
a step of calculating a length of the first communication cable or the second communication cable from the slave device to the breakdown location from the result of the breakdown diagnosis that is read out.

14. A non-transitory computer readable medium, storing a control program causing a control device to function by causing the control device to execute the step as claimed in claim 13.

* * * * *